(12) United States Patent  
Sakakibara

(10) Patent No.: US 7,630,103 B2  
(45) Date of Patent: Dec. 8, 2009

(54) IMAGE READING APPARATUS AND IMAGE FORMING APPARATUS

(75) Inventor: Jun Sakakibara, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 967 days.

(21) Appl. No.: 11/080,983

(22) Filed: Mar. 16, 2005

(65) Prior Publication Data

US 2006/0209360 A1    Sep. 21, 2006

(51) Int. Cl.  
H04N 1/04 (2006.01)

(52) U.S. Cl. .................. 358/482; 358/474; 358/483; 358/461; 358/446; 382/274; 382/275; 395/109; 395/103; 250/208.1; 348/312

(58) Field of Classification Search .............. 358/474, 358/514, 445, 513, 482, 483, 505, 509, 475, 358/518, 520, 529, 448, 461, 465, 452, 1.9; 382/274, 154, 167, 166; 250/208.1; 348/312, 348/E3.027

See application file for complete search history.

(56) References Cited

U.S. PATENT DOCUMENTS

| | | | | |
|---|---|---|---|---|
| 5,157,518 A | * | 10/1992 | Ohtaki et al. | 358/461 |
| 5,177,621 A | * | 1/1993 | Ohtaki et al. | 358/406 |
| 5,206,501 A | * | 4/1993 | Sakakibara et al. | 250/208.1 |
| 5,361,145 A | * | 11/1994 | Hasegawa | 358/514 |
| 6,187,570 B1 | * | 2/2001 | Genders et al. | 435/137 |
| 6,757,084 B2 | * | 6/2004 | Kurita et al. | 358/509 |
| 6,765,703 B1 | * | 7/2004 | Watanabe | 358/514 |
| 7,054,040 B2 | * | 5/2006 | Shoda et al. | 358/474 |
| 7,324,244 B2 | * | 1/2008 | Yamamoto et al. | 358/462 |
| 7,388,691 B2 | * | 6/2008 | Wang | 358/474 |
| 7,471,428 B2 | * | 12/2008 | Ohara et al. | 358/497 |
| 7,538,907 B2 | * | 5/2009 | Nagasaka | 358/1.9 |
| 7,551,327 B2 | * | 6/2009 | Chang et al. | 358/471 |
| 2004/0184104 A1 | * | 9/2004 | Yamamoto et al. | 358/2.1 |

FOREIGN PATENT DOCUMENTS

| | | |
|---|---|---|
| JP | 10-051602 A | 2/1998 |
| JP | 2002-111968 A | 4/2002 |
| JP | 2003-348296 A | 12/2003 |

* cited by examiner

Primary Examiner—Houshang Safaipour  
Assistant Examiner—Negussie Worku  
(74) Attorney, Agent, or Firm—Foley & Lardner LLP

(57) ABSTRACT

When a monochromatic mode is set, a CPU outputs a SW signal and executes a control to input an output from a monochromatic reading line sensor to a CCD signal processing section. Then, after a black level adjustment period ends and a black reference level reaches a desired value, the CPU starts reading of a black reference signal for shading correction. When a color mode is set, the CPU outputs a SW signal and executes a control to input an output from a color reading line sensor to the CCD signal processing section. After the black level adjustment period ends and the black reference level reaches a desired value, the CPU starts reading of a black reference signal for shading correction.

12 Claims, 11 Drawing Sheets

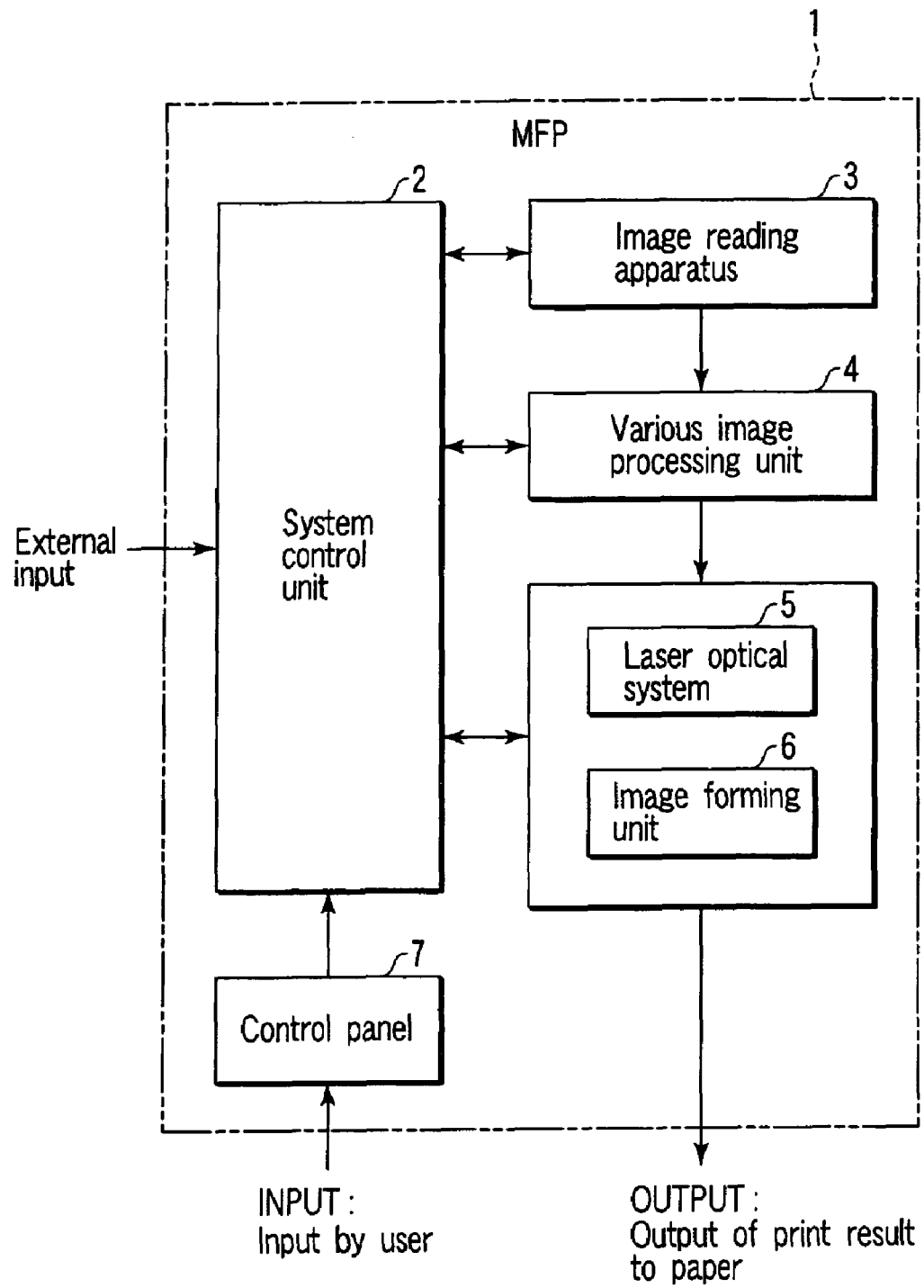
F I G. 1

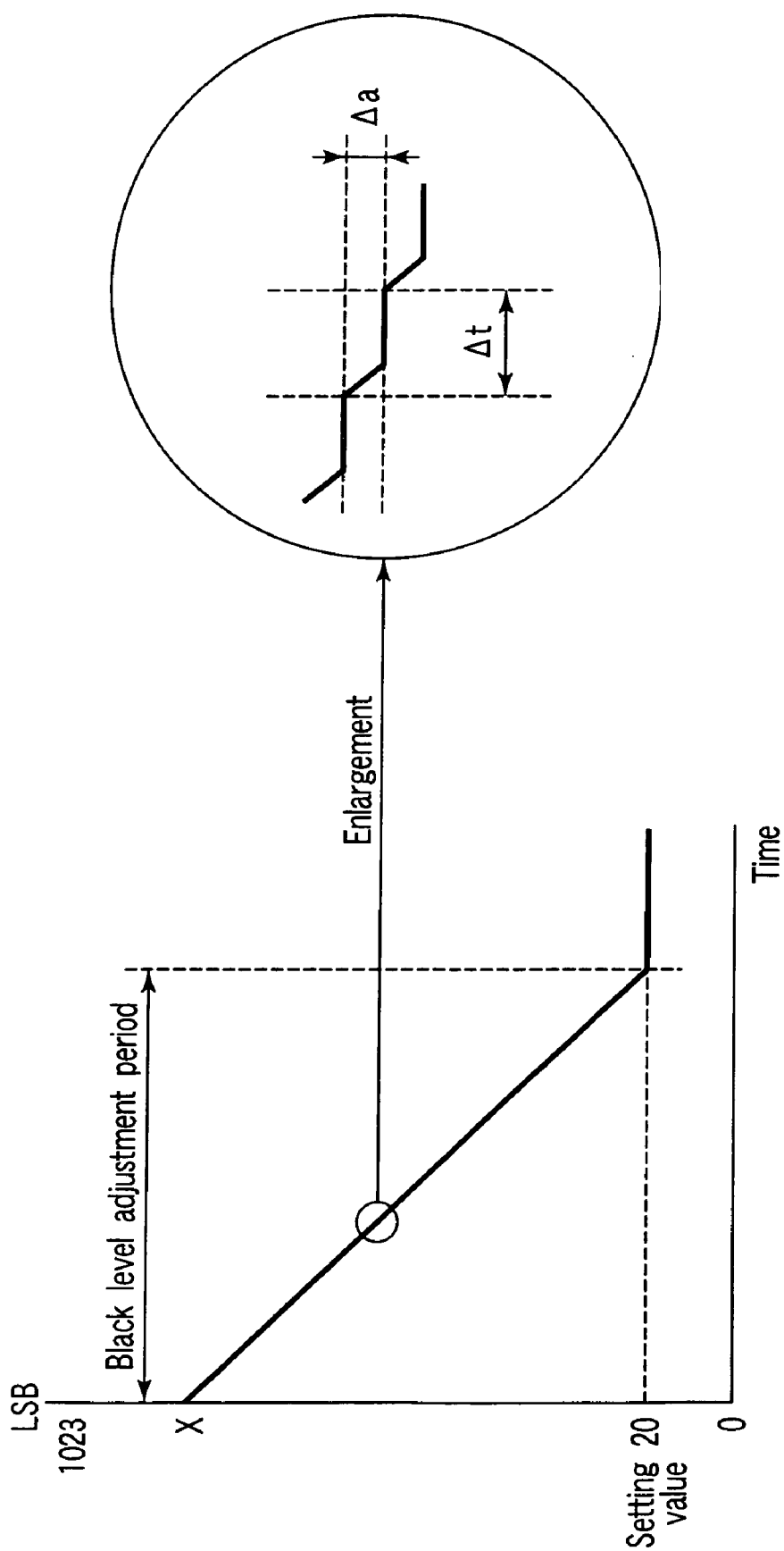
F I G. 6

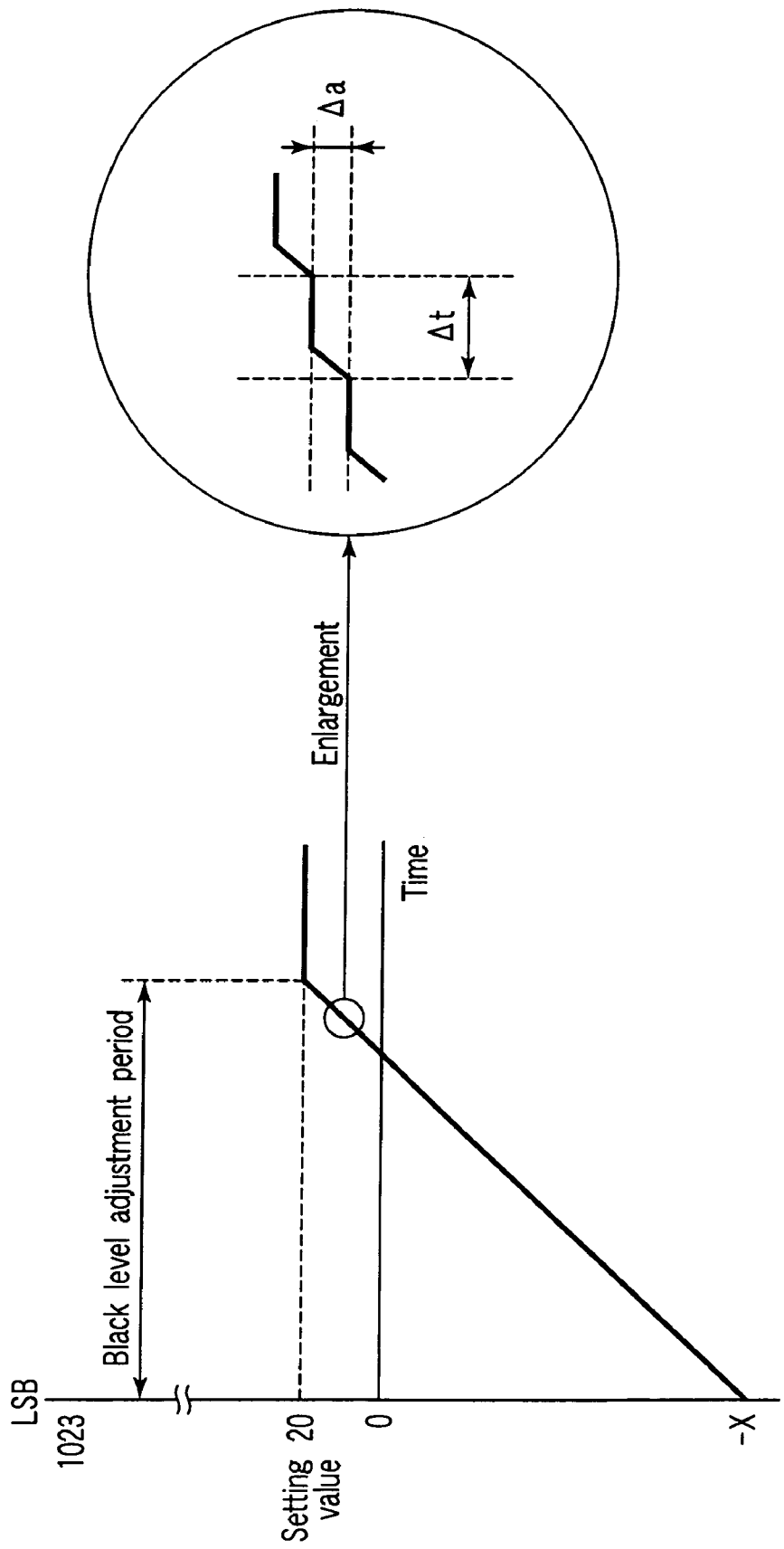
F I G. 7

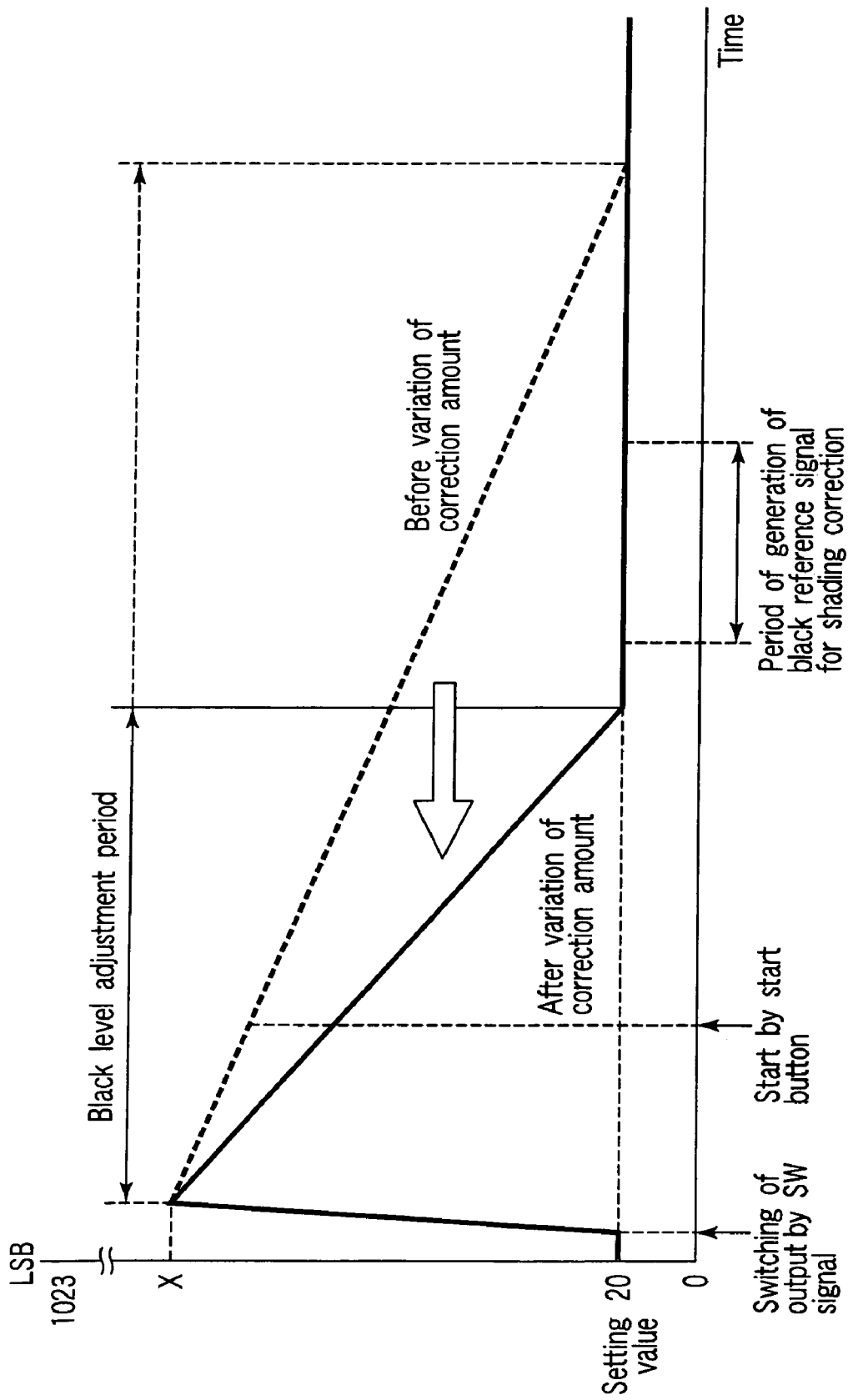
F I G. 10

IMAGE READING APPARATUS AND IMAGE FORMING APPARATUS

BACKGROUND OF THE INVENTION

1. Field of the Invention

The present invention relates to an image reading apparatus and an image forming apparatus, which read a color document or a monochromatic document using a CCD sensor and form an image.

2. Description of the Related Art

In the prior art, a 3-line CCD sensor, which comprises three line sensors of red, green and blue, is generally employed for color image reading by an image reading apparatus. The 3-line CCD sensor is configured to have three one-dimensional line sensors that have light-receiving surfaces on which a red filter, a green filter and a blue filter are disposed, respectively. Because of this structure, it is not possible to read the same location on the original by all the line sensors at a time.

To cope with such a positional displacement in the original scan direction, image signals acquired by the respective line sensors are adjusted for alignment by using a memory circuit that is composed of, e.g. a line memory.

In recent years, 4-line CCD sensors have also been marketed as products. The 4-line CCD sensor is configured such that a line sensor for reading a monochromatic image is added to the 3-line CCD sensor for reading color images. The line sensor for reading a monochromatic image has a light-receiving surface on which no color filter is disposed.

As regards the CCD sensor comprising a plurality of line sensors, a system has begun to be developed as a product, which produces output signals of the respective line sensors by switching the output stage of the CCD sensor, thereby simplifying a rear-stage processing system.

At the output stage of the CCD sensor, the rear-stage processing system, etc. can be simplified by selectively using the outputs of the respective line sensors. However, signals with different amplitudes and waveforms are input to the circuit that processes analog signals in the rear stage of the CCD sensor. Consequently, such a problem arises that an image quality varies and a complex control is required.

BRIEF SUMMARY OF THE INVENTION

The object of an aspect of the present invention is to provide an image reading apparatus and an image forming apparatus, wherein when outputs of individual line sensors of a CCD sensor are switched and used, a variation in image quality in a rear-stage analog signal processing circuit can be prevented by a simple control.

According to an aspect of the present invention, there is provided an image reading apparatus that reads an image on an original using a CCD sensor including a plurality of line sensors, the apparatus comprising: switching means for switching outputs of the plurality of line sensors; processing means for processing an output signal from the line sensor that is switched by the switching means; and control means for executing a control to stop a reading operation until a reference potential in the processing means is stabilized at a desired value.

According to another aspect of the present invention, there is provided an image forming apparatus that reads an image on an original using a CCD sensor including a plurality of line sensors and forms an image, the apparatus comprising: a switch that switches outputs of the plurality of line sensors; an analog processing section that processes an analog signal from the line sensor that is switched by the switch; and a CPU that executes a control to stop a reading operation until a reference potential in the analog processing section is stabilized at a desired value, and to start reading of a black reference signal for shading correction when the reference potential is stabilized at the desired value.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate preferred embodiments of the invention, and together with the general description given above and the detailed description of the embodiments given below, serve to explain the principles of an aspect of the invention.

FIG. 1 schematically shows the structure of a digital multi-function peripheral according to an image forming apparatus of the present invention;

FIG. 6 is a graph that illustrates a difference in potential of a black reference level;

FIG. 7 is a graph that illustrates a difference amount X is less than 0 at an output of an ADC;

FIG. 10 shows a correlation in operational timing between correction and an actual apparatus in the present invention;

DETAILED DESCRIPTION OF THE INVENTION

Figure 2:
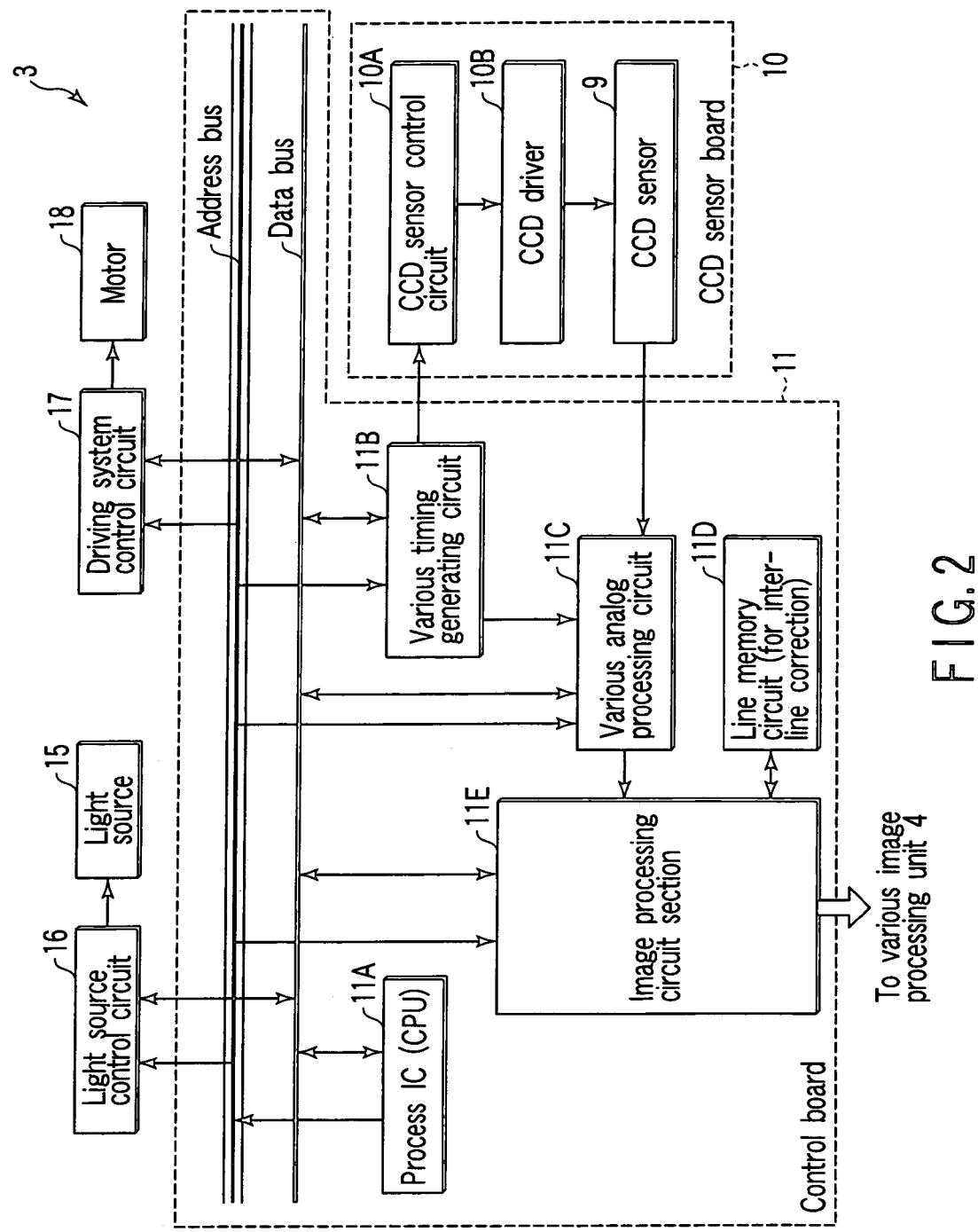
FIG. 2 schematically shows the structure of an image reading apparatus.

An embodiment of the present invention will now be described with reference to the accompanying drawings.

FIG. 1 schematically shows the structure of a digital multi-function peripheral (MFP) according to an image forming apparatus of the present invention. The MFP 1 comprises a system control unit 2 that executes an overall control, an image reading apparatus 3 that reads an image on an original, a various image processing unit 4, a laser optical system 5, an image forming unit 6, and a control panel 7.

FIG. 2 schematically shows the structure of the image reading apparatus 3. The image reading apparatus 3 comprises a CCD sensor board 10, a control board 11, a light source 15, a light source control circuit 16, a driving system control circuit 17, and a motor 18.

The CCD sensor board 10 includes a CCD sensor 9, a CCD sensor control circuit 10A for driving the CCD sensor 9, and a CCD driver 10B that receives an output from the CCD sensor control circuit 10A and matches the output with a driving condition for the CCD sensor 9.

The CCD sensor 9, for example, is provided with line sensors (not shown).

The control board 11 includes a process IC 11A, such as a CPU, a various timing generating circuit 11B, a various analog processing circuit 11C that processes analog signals from the CCD sensor 9, a line memory circuit 11D, and an image processing circuit section 11E.

The process IC (hereinafter referred to as "CPU") 11A controls a signal processing system of the CCD sensor 9, and also controls the light source control circuit 16 that controls the light source 15 using control signals over an address bus and a data bus, and the motor 18 that drives a first carriage and a second carriage (not shown).

The various timing generating circuit 11B generates a signal that is necessary for driving the CCD sensor 9, and a signal that is necessary for various analog processes. The CCD sensor control circuit 10A executes timing adjustment for the signal that is generated by the various timing generating circuit 11B and is necessary for driving the CCD sensor 9. The timing-adjusted signal is input to the CCD sensor 9 via the CCD driver 10B for signal amplitude matching or waveform shaping.

There is no problem even if the CCD sensor control circuit 10A is included in the various timing generating circuit 11B. In the CCD sensor 9 that comprises a plurality of line sensors, the line sensors are so arranged as to be physically separated from one another. Thus, there is a displacement between reading positions of the respective line sensors. The line memory circuit 11D corrects the displacement in reading position.

The image processing circuit section 11E controls the line memory circuit 11D, and also executes processes such as shading correction, enlargement/reduction and LOG conversion, which are carried out using image signals that are A/D converted.

Figure 3:
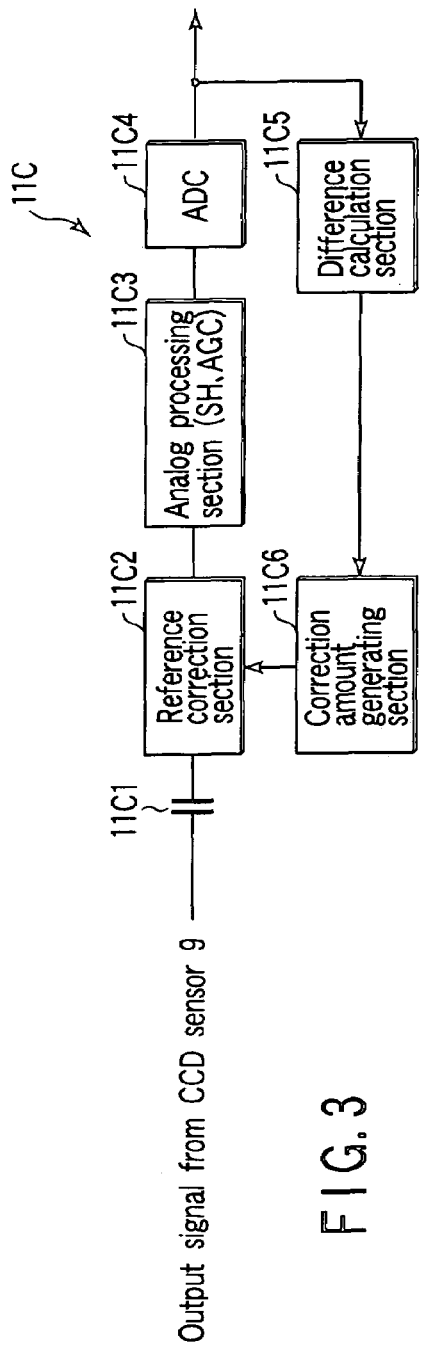
FIG. 3 shows the structure of a various analog processing circuit.

FIG. 3 shows the structure of the various analog processing circuit 11C. The various analog processing circuit 11C comprises a coupling capacitor 11C1, a reference correction section 11C2, an analog processing section 11C3, an ADC 11C4, a difference calculation section 11C5, and a correction amount generating section 11C6.

Figure 4:
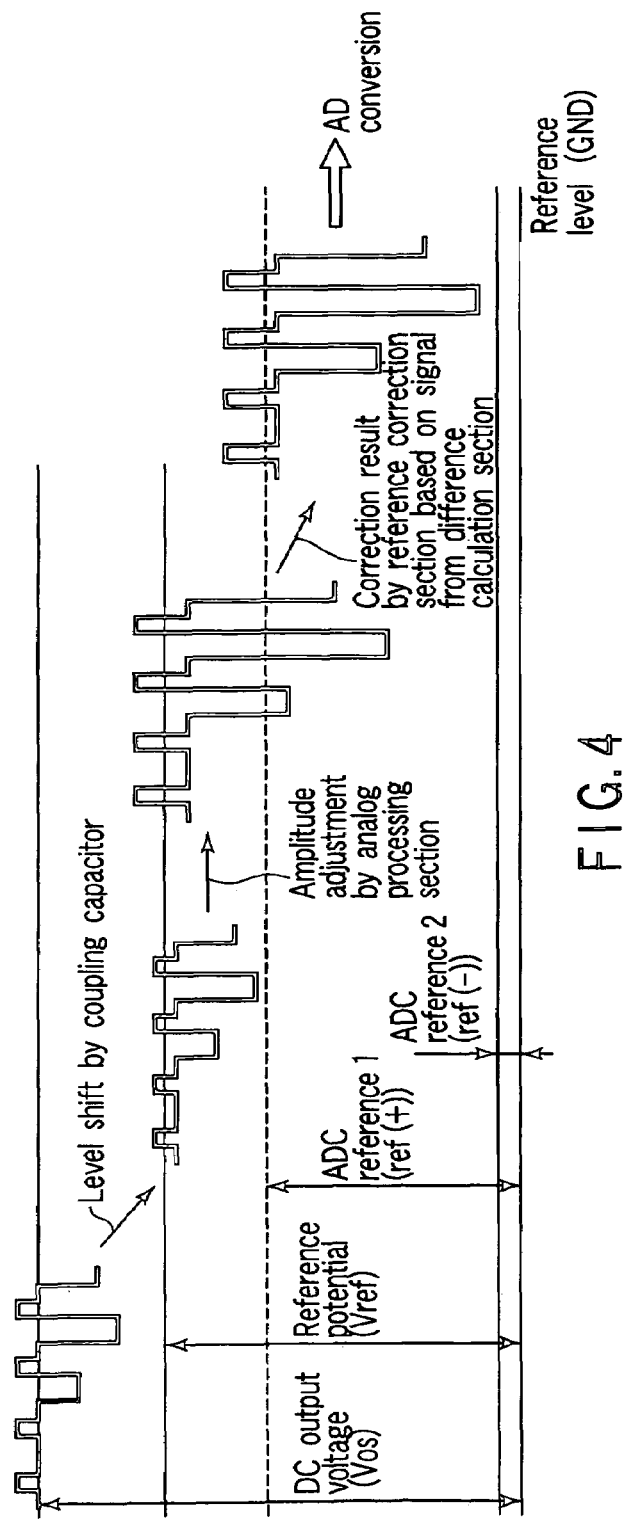
FIG. 4 is a view for explaining an operation in the various analog processing circuit.

FIG. 4 illustrates the operation in the various analog processing circuit 11C.

An output signal from the CCD sensor 9 is produced with a signal output DC voltage (Vos) as a reference voltage. The signal output DC voltage (Vos) varies from CCD sensor to CCD sensor. In the case of a CCD sensor that uses a +12 V power supply, there is a variation of about 3 to 8 V. In order to eliminate a DC component of the signal with a nonconstant level, the coupling capacitor 11C1 is connected in series.

The reference correction section 11C2 executes a process to make the potential of a dummy pixel part or a light shield part to conform to a reference potential (Vref).

The analog processing section 11C3 executes a process to make an analog signal from the reference correction section 11C2 to fall within the input range of the rear-stage ADC 11C4.

The ADC 11C4 executes A/D conversion and outputs a resultant digital signal to the rear-stage image processing circuit section 11E. In this case, in order to make the DC component fall within the input range, the difference calculation section 11C5 detects a difference component.

The correction amount generating section 11C6 executes feedback to the reference correction section 11C2 and adjusts the DC component so that the ADC 11C4 may output a signal with a desired value.

As is shown in FIG. 4, an "H" level reference voltage and an "L" level reference voltage, which are necessary for conversion by the ADC 11C4, are set at an ADC reference 1 (ref (+)) and ADC reference 2 (ref (−)), respectively. The signal processing is executed to make the voltage fall within this range. In this case, if a signal that exceeds the ADC reference 1 (ref (+)) or a signal that is lower than ADC reference 2 (ref (−)) is input, the output of the ADC 11C4 would be saturated. Thus, the signal is controlled so as not to go outside the range between these reference levels.

In addition, since the DC voltage is the reference potential for the CCD sensor 9, the light shield part (not shown) is used. This potential becomes an output at a time when no light is incident on the CCD sensor 9, and is a reference potential for a black signal.

Figure 5A:
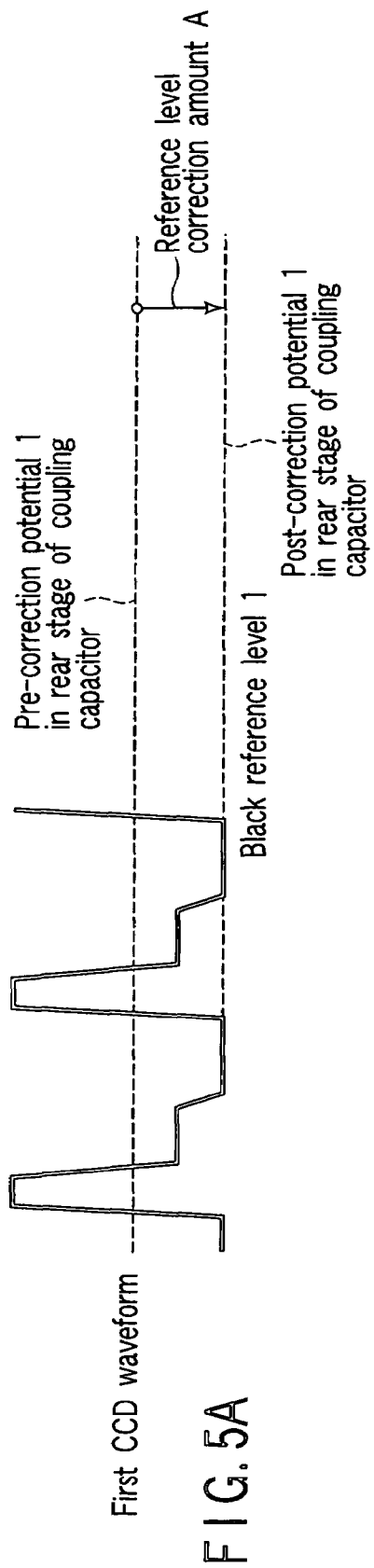
FIG. 5A is a graph that shows an output signal of a different CCD sensor.
Figure 5B:
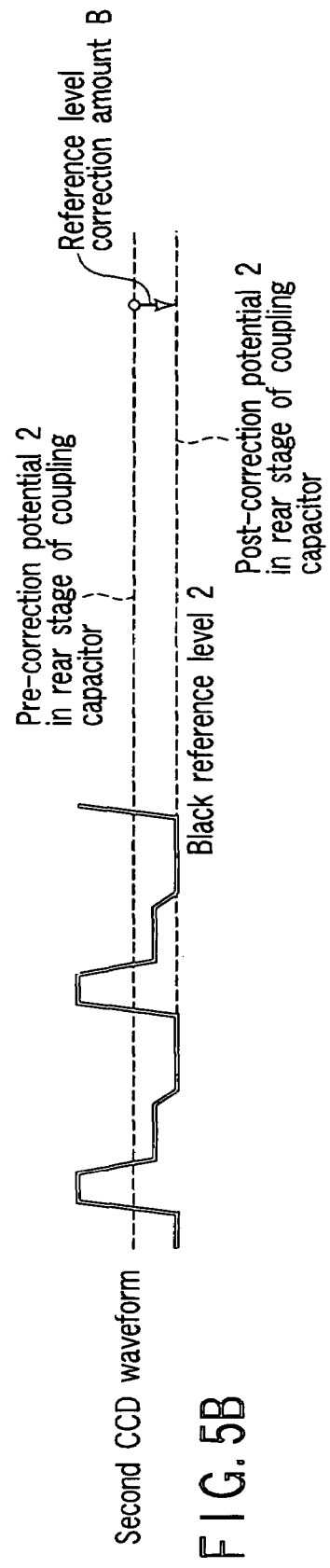
FIG. 5B is a graph that shows an output signal of a different CCD sensor.

FIGS. 5A and 5B show output signals of different CCD sensors 9 according to the present invention.

A first CCD waveform shown in FIG. 5A is obtained in a case where the amplification factor of a buffer amplifier (not shown) provided at the output stage within the CCD sensor 9 is high, and accordingly the line sensor has high sensitivity. In this case, since the amplification factor of the buffer amplifier (not shown) is high, the amplitude of reset noise is large, as shown in FIG. 5A. In a signal at a time when no light is incident on the CCD sensor 9, a DC output component is removed via the coupling capacitor 11C1 and the signal becomes stable at a pre-correction potential 1 that is an intermediate potential between the reset noise and a black reference level 1, as shown in the Figure.

Since the reference potential of the CCD sensor 9 is set at the black reference level 1, it is necessary to vary the potential by a reference level correction amount A. Thus, the reference level correction amount A is calculated by the difference calculation section 11C5. A specific correction amount is generated by the correction amount generating section 11C6 so as to reduce the reference level correction amount A to "0", and the reference correction section 11C2 executes correction.

A second CCD waveform shown in FIG. 5B is obtained in a case where the amplification factor of a buffer amplifier (not shown) provided at the output stage within the CCD sensor 9 is lower than the amplification factor of the above-mentioned buffer amplifier. In this case, since the amplification factor is low, the amplitude of reset noise is small, as shown in FIG. 5B. As regards the operation, like the first CCD waveform, the signal becomes stable at a pre-correction potential 2 that is an intermediate potential between the reset noise and the black reference level. Since the reference potential of the CCD sensor 9 is set at the black reference level, it is necessary to vary the potential by a reference level correction amount B. The operation relating to the correction is similar with the case of the first CCD waveform.

When the first CCD waveform and the second CCD waveform are switched by a SW signal from outside, the potential of the black reference level considerably deviates since their signal waveforms are entirely different.

FIG. 6 shows a deviation in potential of the black reference level, and X denotes the amount of deviation. In FIG. 6, it is assumed that the resolution of the ADC 11C4 is 10 bits and a desired black reference value is 20 LSB (/1023 LSB) in the ADC 11C4.

When the black reference potential rises due to the switching operation, the output X of the ADC 11C4 is gradually corrected so as to become 20 LSB. In this case, as shown in FIG. 6 in enlarged scale, the correction is executed in units of Δt, and the correction amount is Δa that is generated by the correction amount generating section 11C6. Since Δt is the cycle for correction, Δt=tINT (light accumulation time) if the correction is executed at the timing of a clamp signal (not shown). In this manner, the correction is gradually executed in units of tINT, and the correction is repeated until a desired value is attained. This time period is referred to as "black level adjustment period".

FIG. 7 illustrates a correction operation in a case where the potential of the black reference level is varied in a reverse direction by the SW signal.

In FIG. 7, the deviation amount X in the output of the ADC 11C4 is less than 0, and the potential is corrected as indicated by broken lines. However, the output of the ADC 11C4 continues to be 0 until the correction amount reaches a predetermined level. Thereafter, the correction is repeated until the desired value of 20 LSB is gradually reached.

In this description, the black reference level is set at 20 LSB, but it may be set at another value. However, if the black reference level is set at 0 LSB, it cannot be determined whether the output of the ADC 11C4 is saturated and continues to be 0 or is normally corrected. Thus, in normal cases, the black reference level is set at a value higher than 0.

Figure 8:
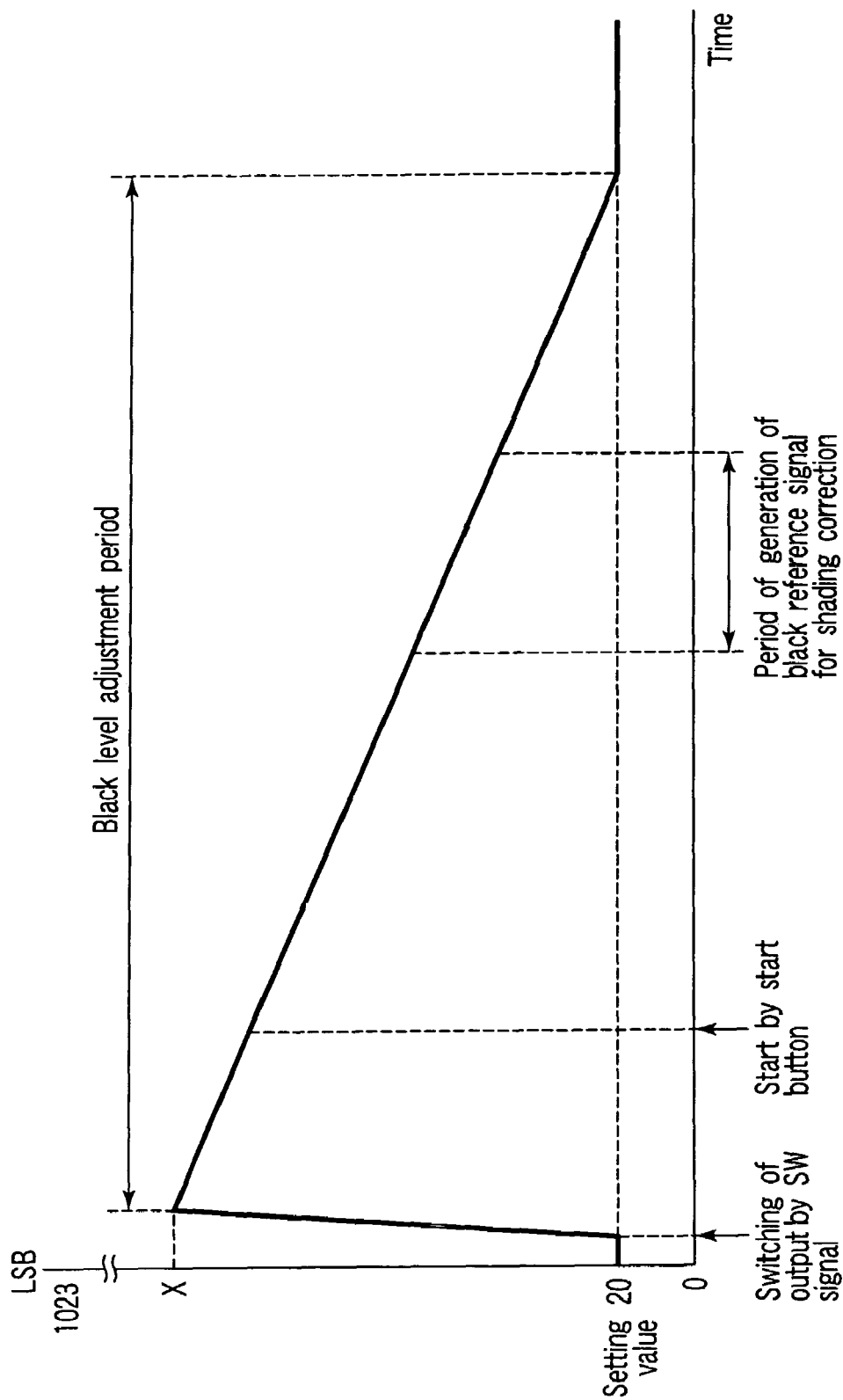
FIG. 8 shows a correlation in operational timing between correction and an actual apparatus.

FIG. 8 shows a correlation between the correction, as illustrated in FIGS. 5A and 5B, and the actual apparatus. The abscissa indicates time and ordinate indicates the output of the ADC 11C4.

When the user performs a copying operation, an original mode setting is executed using, e.g. the control panel 7. Since two kinds of line sensors with different sensitivities are used, setting is executed as regards whether the density on the original is low or high. Based on the setting, the SW signal is input to the CCD sensor 9 and the output is switched.

Thereafter, the user presses a START button (not shown) on the control panel 7, and starts the copying operation. In an alternative configuration, the SW signal may be input to the CCD sensor 9 via the system control unit 2 after the START button (not shown) is pressed.

Subsequently, correction is executed so as to bring the black reference level to the desired value of 20 LSB. However, since a shading correction process is executed during this correction period, i.e. the black level adjustment period, the black reference signal, if generated, does not have the desired value and the image becomes defective.

A calculation formula for shading correction is shown below as a point of reference:

$$Dout=(Din-Dbk)/(Dwt-Dbk) \times k$$

where Din is image data prior to correction, Dout is image data after correction, Dbk is black reference data that is a mean value of image data for plural lines in the off-state of the light source 15, and Dwt is white reference data that is a mean value of image data obtained by reading plural lines on a white reference plate 13 in the on-state of the light source. The mean values are used as the black reference data and white reference data in order to minimize the effect of specific points.

In the above formula, "k" is a resolution of image data after shading, and "k" is 255 in the case of an 8-bit architecture and is 1023 in the case of a 10-bit architecture.

As is understood from the above formula, Dbk is an offset component that is included in the image data. As shown in FIG. 8, since a value that is different from a desired value is eliminated as an offset, the image data will vary.

Figure 9:
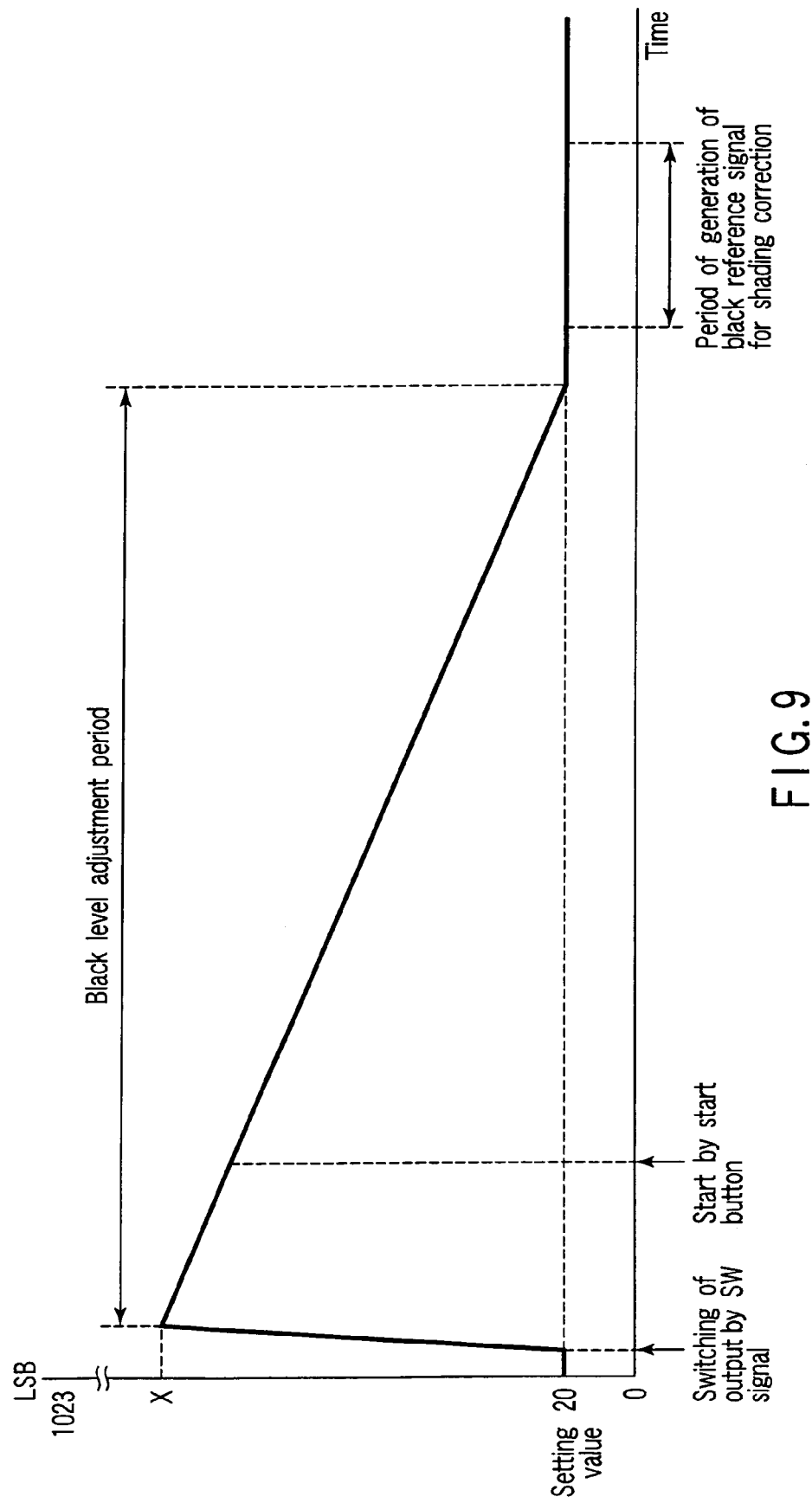
FIG. 9 shows a correlation in operational timing between correction and an actual apparatus in the present invention.

FIG. 9 shows a correlation between the correction, illustrated in FIGS. 5A and 5B, and the actual apparatus. The abscissa indicates time and ordinate indicates the output of the ADC 11C4.

In the present invention, as shown in FIG. 9, the CPU 11A starts reading of a black reference signal for shading correction, after the black level adjustment period ends and the black reference level reaches a desired value (setting value 20).

FIG. 10 shows another correlation between the correction, illustrated in FIGS. 5A and 5B, and the actual apparatus. The abscissa indicates time and ordinate indicates the output of the ADC 11C4.

In this case, as shown in FIG. 10, the CPU 11A sets the correction amount of the correction amount generating section 11C6 of various analog processing circuit 11C to be greater than a normal correction amount, thereby decreasing the black level adjustment period.

Although it is possible to set the correction amount of the correction amount generating section 11C6 at a large value from the time of the normal operation, the correction amount would become too large in this case and, consequently, the signal may be output without reaching the desired value, i.e. 20 LSB. Moreover, since the correction value is always large, the amount of heat produced would increase. Thus, the correction amount is increased only when a large variation occurs in the waveform of the CCD sensor 9 that is connected to the coupling capacitor 11C1, resulting in a large variation in the value of the ADC 11C4 at the time of the black reference reading.

In the above description of the invention, the outputs of the two line sensors with different sensitivities are switched. However, this invention is also effective in the case where a monochromatic reading line sensor with a high sensitivity and a color reading line sensor, which has a color filter on its light-receiving surface and has a lower sensitivity than the monochromatic reading line sensor, are used by switching the outputs from both line sensors.

Figure 11:
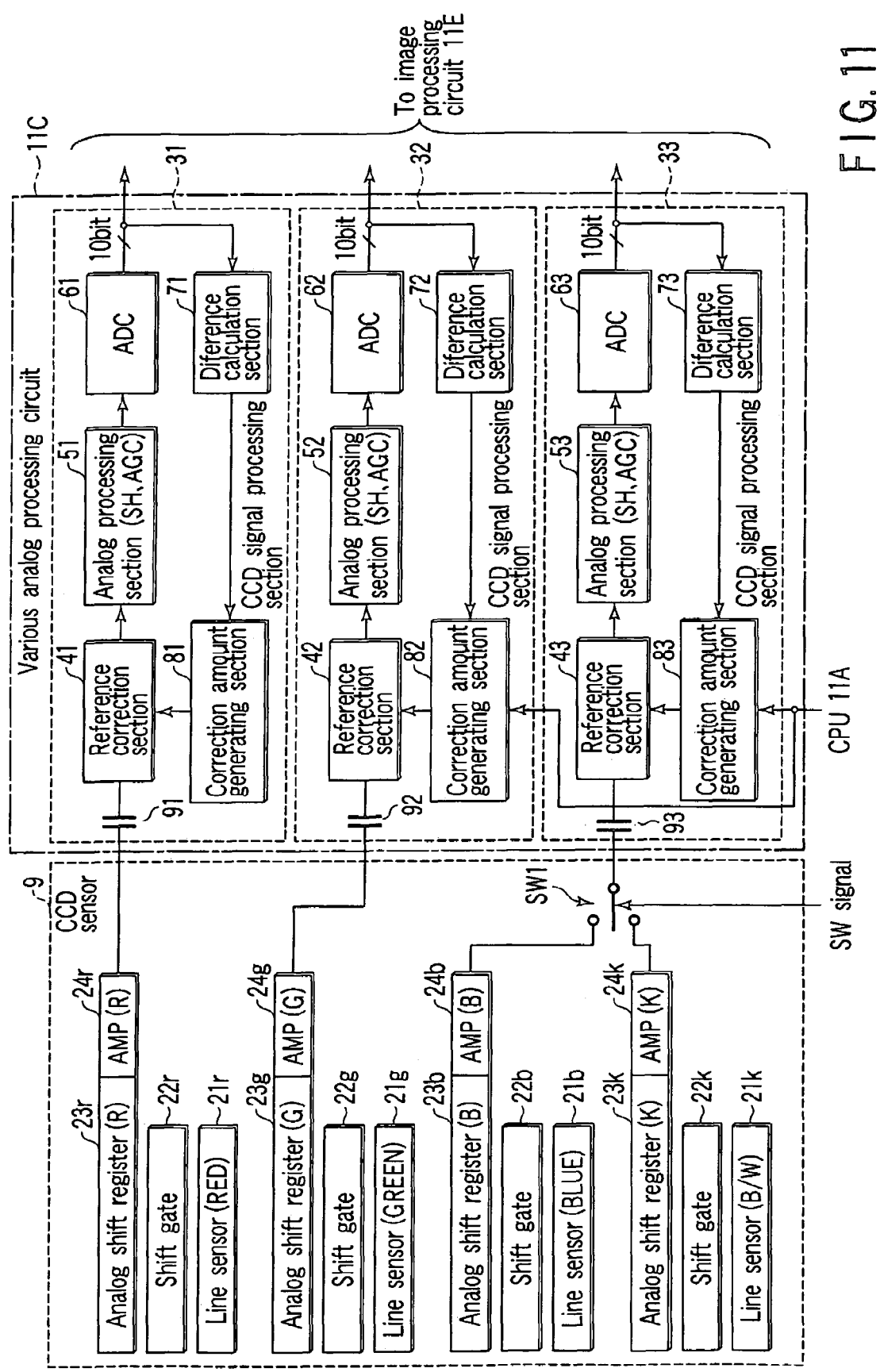
FIG. 11 is a block diagram that schematically shows the structure of a CCD sensor and a various analog processing circuit according to a first embodiment of the present invention.

FIG. 11 schematically shows the structures of a CCD sensor 9 and a various analog processing circuit 11C according to a first embodiment of the present invention.

The CCD sensor 9 is a 4-line CCD sensor that comprises a RED line sensor 21r, a GREEN line sensor 21g, a BLUE line sensor 21b, and BLACK/WHITE line sensor 21k.

The RED line sensor 21r has a RED color filter (not shown) disposed on its light-receiving surface, and accumulates a charge by converting (photoelectric conversion) incident light to a charge amount corresponding to the incident light amount. The accumulated charge is transferred to an analog shift register 23r via a shift gate 22r. The charge that has been transferred to the analog shift register 23r is successively shifted to a rear-stage AMP 24r. The AMP 24r outputs the charge to the next-stage various analog processing circuit 11C.

Similarly, the GREEN line sensor 21g has a GREEN color filter (not shown) disposed on its light-receiving surface, and accumulates a charge by converting (photoelectric conversion) incident light to a charge amount corresponding to the incident light amount. The accumulated charge is transferred to an analog shift register 23g via a shift gate 22g. The charge that has been transferred to the analog shift register 23*g* is successively shifted to a rear-stage AMP 24*g*. The AMP 24*g* outputs the charge to the next-stage various analog processing circuit 11C.

In like fashion, the BLUE line sensor 21*b* has a BLUE color filter (not shown) disposed on its light-receiving surface, and accumulates a charge by converting (photoelectric conversion) incident light to a charge amount corresponding to the incident light amount. The accumulated charge is transferred to an analog shift register 23*b* via a shift gate 22*b*. The charge that has been transferred to the analog shift register 23*b* is successively shifted to a rear-stage AMP 24*b*. The AMP 24*b* outputs the charge to the next-stage various analog processing circuit 11C.

The BLACK/WHITE line sensor 21*k* has no color filter on its light-receiving surface, and accumulates a charge by converting (photoelectric conversion) incident light to a charge amount corresponding to the incident light amount. The accumulated charge is transferred to an analog shift register 23*k* via a shift gate 22*k*. The charge that has been transferred to the analog shift register 23*k* is successively shifted to a rear-stage AMP 24*k*. The AMP 24*k* outputs the charge to the rear stage.

As will be described later in greater detail, one of the output signal from the AMP 24*b* and the output signal from the AMP 24*k* is selected by a rear-stage switch SW1 that is operated by a SW signal from the CPU 11A. The selected output alone is delivered to the rear-stage various analog processing circuit 11C.

The various analog processing circuit 11C comprises CCD signal processing sections 31, 32 and 33.

The CCD signal processing section 31 comprises a reference correction section 41 that is connected via a coupling capacitor 91, an analog processing section 51, an ADC 61, a difference calculation section 71 and a correction amount generating section 81.

The CCD signal processing section 32 comprises a reference correction section 42 that is connected via a coupling capacitor 92, an analog processing section 52, an ADC 62, a difference calculation section 72 and a correction amount generating section 82.

The CCD signal processing section 33 comprises a reference correction section 43 that is connected via a coupling capacitor 93, an analog processing section 53, an ADC 63, a difference calculation section 73 and a correction amount generating section 83.

The present first embodiment includes the monochromatic reading line sensor 21*k* and three color reading line sensors 21*r*, 21*g* and 21*b*. Of the three color reading line sensors, the output of the BLUE line sensor 21*b* and the output of the monochromatic reading line sensor 21*k* are switched by the switch SW1.

In FIG. 11, the switching with the output of the BLUE line sensor is effected. Alternatively, the switching with the output of the GREEN line sensor or RED line sensor may be executed. The monochromatic reading line sensor and the three color reading line sensors may be constructed on the same wafer as a 4-line sensor, or may be constructed as separated devices. In addition, the switch (switching section) for switching the outputs of the lines sensors may be constructed on the outside of the CCD sensor 9.

Next, a first operation of the above-described structure of the first embodiment is described.

To start with, when the user performs a copying operation, he/she sets one of a monochromatic mode and a color mode using, e.g. the control panel 7.

When the monochromatic mode is set, the CPU 11A delivers a SW signal to the switch SW1, thereby executing a control to input the output of the monochromatic reading line sensor 21*k* to the CCD signal processing section 33. Then, after the black level adjustment period ends and the black reference level comes to the desired level (setting value 20), as shown in FIG. 9, the CPU 11A starts reading the black reference signal for shading correction.

When the color mode is set, the CPU 11A delivers a SW signal to the switch SW1, thereby executing a control to input the output of the color reading line sensor 21*b* to the CCD signal processing section 33. Then, after the black level adjustment period ends and the black reference level comes to the desired level (setting value 20), as shown in FIG. 9, the CPU 11A starts reading the black reference signal for shading correction.

Next, a second operation of the above-described structure of the first embodiment is described.

To start with, when the user performs a copying operation, he/she sets one of a monochromatic mode and a color mode using, e.g. the control panel 7.

When the monochromatic mode is set, the CPU 11A delivers a SW signal to the switch SW1, thereby executing a control to input the output of the monochromatic reading line sensor 21*k* to the CCD signal processing section 33. Then, the CPU 11A varies the setting of a correction amount $\Delta a$ in the correction amount generating section 83, thereby decreasing the black level adjustment period, as shown in FIG. 10. After the black level adjustment period ends and the black reference level comes to the desired level (setting value 20), the CPU 11A starts reading the black reference signal for shading correction.

When the color mode is set, the CPU 11A delivers a SW signal to the switch SW1, thereby executing a control to input the output of the color reading line sensor 21*b* to the CCD signal processing section 33. Then, the CPU 11A varies the setting of a correction amount $\Delta a$ in the correction amount generating section 83, thereby decreasing the black level adjustment period, as shown in FIG. 10. After the black level adjustment period ends and the black reference level comes to the desired level (setting value 20), the CPU 11A starts reading the black reference signal for shading correction.

As has been described above, according to the first embodiment, the reading operation is not executed until the initial potential at the time of switching is corrected to the desired potential. Thereby, it becomes possible to suppress degradation in image quality due to a variation in black reference level, which is caused by a difference in amplitude of outputs of the line sensors after the switching.

Next, a second embodiment of the invention is described.

Figure 12:
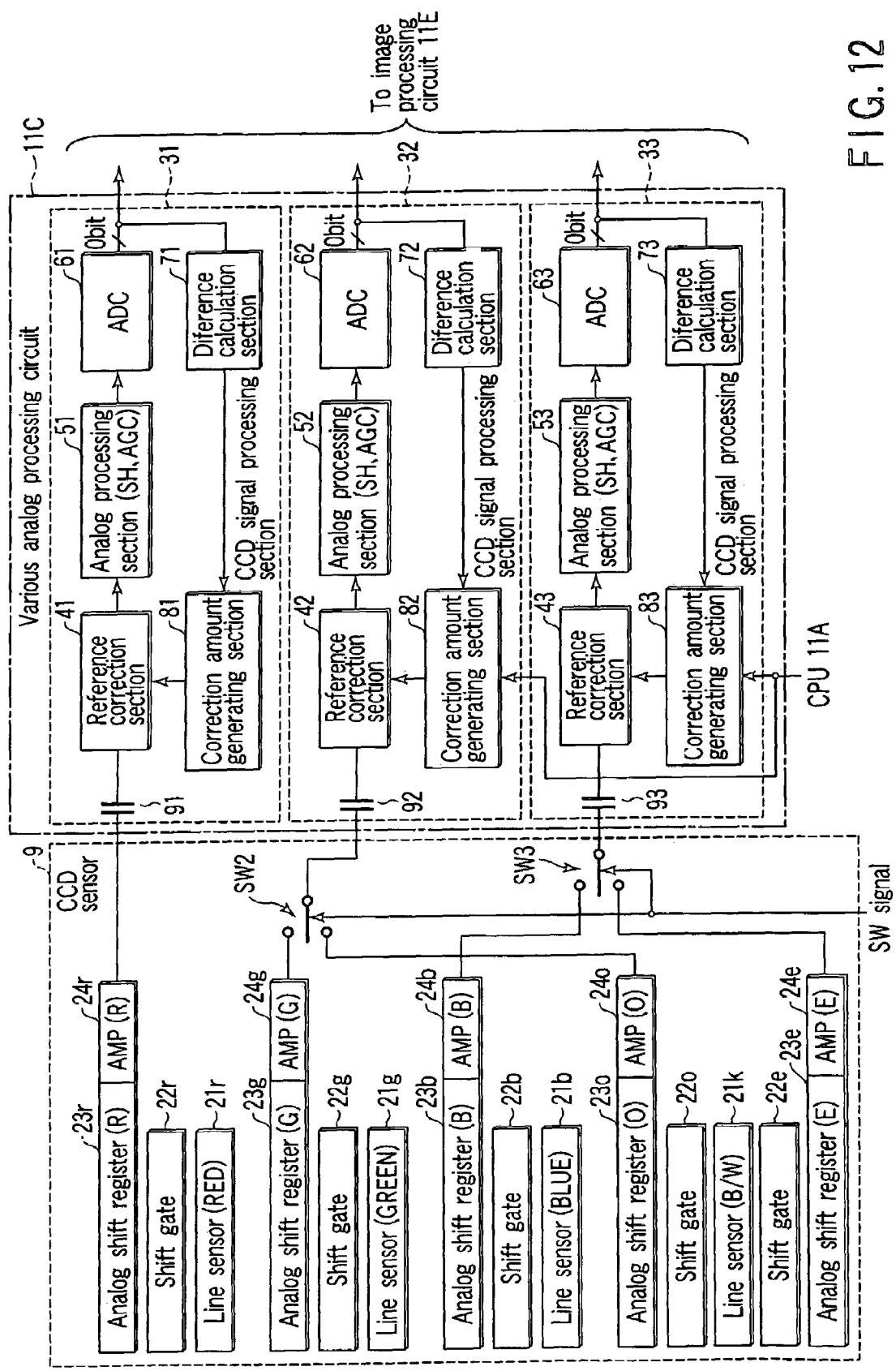
FIG. 12 is a block diagram that schematically shows the structure of a CCD sensor and a various analog processing circuit according to a second embodiment of the present invention.

FIG. 12 schematically shows the structures of a CCD sensor 9 and a various analog processing circuit 11C according to the second embodiment of the present invention. The parts common to those in the first embodiment shown in FIG. 11 are denoted by like reference numerals, and a description thereof is omitted.

In the second embodiment, photodiodes of the BLACK/WHITE line sensor 21*k* are arranged such that charges are transferred separately between an odd-side and an even-side.

A charge that is accumulated in the odd-side is transferred to an analog shift register 23*o* via a shift gate 22*o*. The charge that is transferred to the analog shift register 23*o* is successively shifted to a rear-stage AMP 24*o*, and the AMP 24*o* outputs the charge to the rear stage.

A charge that is accumulated in the even-side is transferred to an analog shift register 23*e* via a shift gate 22*e*. The charge that is transferred to the analog shift register 23*e* is successively shifted to a rear-stage AMP 24*e*, and the AMP 24*e* outputs the charge to the rear stage.

One of the output signal from the AMP 24g and the output signal from the AMP 24o is selected by a rear-stage switch SW2 that is operated by a SW signal from the CPU 11A. The selected output alone is delivered to the CCD signal processing section 32 of the rear-stage various analog processing circuit 11C.

One of the output signal from the AMP 24b and the output signal from the AMP 24e is selected by a rear-stage switch SW3 that is operated by a SW signal from the CPU 11A. The selected output alone is delivered to the CCD signal processing section 33 of the rear-stage various analog processing circuit 11C.

Next, a first operation of the above-described structure of the second embodiment is described.

To start with, when the user performs a copying operation, he/she sets one of a monochromatic mode and a color mode using, e.g. the control panel 7.

When the monochromatic mode is set, the CPU 11A delivers SW signals to the switches SW2 and SW3, thereby executing a control to input the output of the odd-side of the monochromatic reading line sensor 21k to the CCD signal processing section 32 and to input the output of the even-side of the monochromatic reading line sensor 21k to the CCD signal processing section 33. Then, after the black level adjustment period ends and the black reference level comes to the desired level (setting value 20), as shown in FIG. 9, the CPU 11A starts reading the black reference signal for shading correction.

When the color mode is set, the CPU 11A delivers SW signals to the switches SW2 and SW3, thereby executing a control to input the output of the color reading line sensor 21g to the CCD signal processing section 32 and to input the output of the color reading line sensor 21b to the CCD signal processing section 33. Then, after the black level adjustment period ends and the black reference level comes to the desired level (setting value 20), as shown in FIG. 9, the CPU 11A starts reading the black reference signal for shading correction.

Next, a second operation of the above-described structure of the second embodiment is described.

To start with, when the user performs a copying operation, he/she sets one of a monochromatic mode and a color mode using, e.g. the control panel 7.

When the monochromatic mode is set, the CPU 11A delivers SW signals to the switches SW2 and SW3, thereby executing a control to input the output of the odd-side of the monochromatic reading line sensor 21k to the CCD signal processing section 32 and to input the output of the even-side of the monochromatic reading line sensor 21k to the CCD signal processing section 33. Then, the CPU 11A varies the setting of a correction amount $\Delta a$ in the correction amount generating sections 82 and 83, thereby decreasing the black level adjustment period, as shown in FIG. 10. After the black level adjustment period ends and the black reference level comes to the desired level (setting value 20), the CPU 11A starts reading the black reference signal for shading correction.

When the color mode is set, the CPU 11A delivers SW signals to the switches SW2 and SW3, thereby executing a control to input the output of the color reading line sensor 21g to the CCD signal processing section 32 and to input the output of the color reading line sensor 21b to the CCD signal processing section 33. Then, the CPU 11A varies the setting of a correction amount $\Delta a$ in the correction amount generating sections 82 and 83, thereby decreasing the black level adjustment period, as shown in FIG. 10. After the black level adjustment period ends and the black reference level comes to the desired level (setting value 20), the CPU 11A starts reading the black reference signal for shading correction.

As has been described above, according to the second embodiment, the reading operation is not executed during the black reference level adjustment period. Thereby, a stable image that is free from degradation in image quality can be obtained.

According to the embodiments of the invention, as described above, when CCD sensors with different sensitivities are to be connected to the rear-stage processing section, the image reading operation is not executed until the reference value reaches the desired value. After the reference value reaches the desired value, the reading operation for the image including the reference value is executed. Thereby, even if a variation occurs in the signal from the CCD sensor, a high-quality image can be obtained.

In addition, when the outputs of CCD sensors are switched, the correction value is set to be greater than the normal value only while the operation for bringing the reference value to the desired value is being executed. Thereby, the time for bringing the reference value to the desired value is decreased, and accordingly the time that is needed until the start of the reading operation is decreased.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image reading apparatus that reads an image on an original using a CCD sensor including a plurality of line sensors, the apparatus comprising:
   switching means for switching outputs of the plurality of line sensors;
   processing means for processing an output signal from a line sensor that is switched by the switching means; and
   control means for executing a control to stop a reading operation until a reference potential in the processing means is stabilized at a desired value,
   wherein the control means executes a control to set a correction amount for correction to the desired value by the processing means to be greater than a normal correction amount until the reference potential is stabilized at the desired value.

2. The image reading apparatus according to claim 1, wherein the switching means switches an output of a monochromatic reading line sensor and an output of a color reading line sensor.

3. The image reading apparatus according to claim 1, wherein the processing means corrects a DC voltage component of an output signal from the line sensor to a desired value.

4. The image reading apparatus according to claim 1, wherein the reference potential is a potential in a state in which no external light is incident on the CCD sensor.

5. The image reading apparatus according to claim 1, wherein the desired value is a black reference level of 20 LSB.

6. The image reading apparatus according to claim 1, wherein a time period that is needed to stabilize the reference potential at the desired value is a black level adjustment period for black level adjustment by the processing means.

7. An image reading apparatus that reads an image on an original using a CCD sensor including a plurality of line sensors, the apparatus comprising:

a switch that switches outputs of the plurality of line sensors;

an analog processing section that processes an analog signal from a line sensor that is switched by the switch; and a CPU that executes a control to stop a reading operation until a reference potential in the analog processing section is stabilized at a desired value, wherein the CPU executes a control to set a correction amount for correction to the desired value by the analog processing section to be greater than a normal correction amount until the reference potential is stabilized at the desired value.

8. The image reading apparatus according to claim 7, wherein the switch switches a monochromatic reading line sensor and a color reading line sensor in accordance with a control signal from the CPU.

9. The image reading apparatus according to claim 7, wherein the analog processing section corrects a DC voltage component of an analog signal from the line sensor to a desired value.

10. An image forming apparatus that reads an image on an original using a CCD sensor including a plurality of line sensors and forms an image, the apparatus comprising:

a switch that switches outputs of the plurality of line sensors;

an analog processing section that processes an analog signal from a line sensor that is switched by the switch; and a CPU that executes a control to stop a reading operation until a reference potential in the analog processing section is stabilized at a desired value, and to start reading of a black reference signal for shading correction when the reference potential is stabilized at the desired value, wherein the CPU executes a control to set a correction amount for correction to the desired value by the analog processing section to be greater than a normal correction amount until the reference potential is stabilized at the desired value.

11. The image forming apparatus according to claim 10, wherein the switch switches an output of a monochromatic reading line sensor and an output of a color reading line sensor in accordance with a control signal from the CPU, which is based on setting of a monochromatic mode or a color mode.

12. The image forming apparatus according to claim 10, wherein the analog processing section corrects a DC voltage component of an analog signal from the line sensor to a desired value.

* * * * *